March 9, 1943. R. B. BOURNE Re. 22,283

SOUND ATTENUATING DEVICE

Original Filed Feb. 17, 1936 2 Sheets-Sheet 1

INVENTOR
ROLAND B. BOURNE
BY Chapin & Neal
ATTORNEYS

March 9, 1943. R. B. BOURNE Re. 22,283

SOUND ATTENUATING DEVICE

Original Filed Feb. 17, 1936 2 Sheets-Sheet 2

INVENTOR
ROLAND B. BOURNE
BY
Clapin & Neal
ATTORNEYS

Reissued Mar. 9, 1943

Re. 22,283

UNITED STATES PATENT OFFICE 22,283

SOUND ATTENUATING DEVICE

Roland B. Bourne, West Hartford, Conn., assignor to The Maxim Silencer Company, Hartford, Conn., a corporation of Connecticut Original No. 2,043,731, dated June 9, 1936, Serial No. 64,223, February 17, 1936. Application for reissue January 11, 1943, Serial No. 472,051

20 Claims. (Cl. 181—48)

The present invention relates to silencing means suitable for quieting the exhausts of internal combustion engines, blowers and similar sounds, while imposing a minimum of back pressure to the flow of exhaust or other gases therethrough.

There are, in general, two distinct methods previously available for attenuating sound waves traveling through an unobstructed pipe or conduit; attenuation by means of sound absorption in the walls of the passage, which may be lined with sound absorbing material, and attenuation by means of acoustic side-branches suitably coupled to the conduit. Both of these means have been widely used in industrial sound attenuating. The former method is effective in attenuating sounds of relatively high frequency, while the latter method is readily adaptable to efficiently attenuating sounds of relatively low frequency.

In the silencing of complex sounds containing many sound frequencies over a very wide frequency range, it is generally necessary to resort to both of the above means for obtaining satisfactory attenuation. The attenuation vs. frequency characteristic, which I shall hereinafter refer to as the "plot" germane to some particular device, is very useful in describing the functioning of the various embodiments of the invention to be described herein. The plot of a silencer employing reactive acoustic side-branches only is a peaked curve and may be very irregular in shape. In other words, the attenuation for a given sound frequency may be very high, while for a sound frequency but little different may be so low as to be of no practical use in silencing industrial noises. Such irregular plots are the result of the variation, with the frequency, of acoustic impedance of the side branches and of the main sound conducting channel to which such side branches are acoustically coupled; and more particularly are due to the fact that, as the frequency is varied, the impedance of the side branches does not change at the same rate as does the impedance of the main channel. The plot of a silencer employing a purely absorptive, lined channel, on the other hand, is a relatively smooth curve increasing with frequency. The attenuation at relatively low frequencies is so small, however, that excessively large quantities of sound absorbing material must necessarily be used, making the device unwieldy and costly. What is desired is a device which will offer a uniformly high degree of attenuation to a continuous range of sound frequencies such as are likely to be encountered in silencing industrial pipe-borne noises in the field. Such a device may be installed with positive assurance that no sound frequencies can escape therefrom without suffering the desired degree of attenuation. This ideal device would have no pass bands or regions of low attenuation excepting at or near zero frequency (since the exhaust or other gases must be passed without imposing any undue amount of back pressure) and would have no high sharp attenuation peaks in its plot to yield unnecessarily high attenuation to a few very narrow ranges of frequencies. The attenuating efficiency, considering all factors, would be a maximum and would be uniform throughout the operating sound spectrum.

It is a prime purpose of my invention to provide a method and a construction whereby the ideal results as hereinbefore discussed are practically realized.

It is a further purpose of the invention to provide a universal silencer of simple construction and low manufacturing cost.

Another purpose of the invention is to provide a silencing unit whereby several such units may be cascaded to provide any degree of attenuation desired over a wide range of sound frequencies.

In the following discussion and description of the principles and embodiments of the invention, use is made of graphs and an approximate theory whereby the functioning of the devices is explained, and the improvements over previously known devices are explained.

Referring now to the drawings—

All of the devices shown herein have straight sound and gas conducting passages, although the application of the principles of the invention is by no means limited to such channels or conduits.

In all the devices shown herein, acoustic resistance plays an important part. The acoustic resistance of the main channel may be taken as the radiation resistance of the medium. The resistance in the side branches is predominantly that due to viscosity in the interstices of the sound absorbing material used. The specific material used will depend to some extent upon the use to which the device is to be put, and particularly upon the conditions of heat, moisture, and deposit formation of the gas passing through the device. For conditions involving no substantial heat, moisture, or deposit formation hair felt may be used. For other purposes resort may be had to other standard materials such as metal wool, vermiculite, etc. This viscous resistance varies greatly with different materials and with the manner of using them. It is, for instance, increased for a given material by packing such material into greater compression. Absorption of moisture, etc., changes the viscous resistance of the material. This is one reason why it is somewhat diffcult to present an exact acoustic theory of my invention which will accurately predict quantitatively the actual acoustic performance of a device built in accordance with the principles disclosed herein. An approximate theory has been worked out which is useful in explaining the unique performance obtained.

Figure 1:
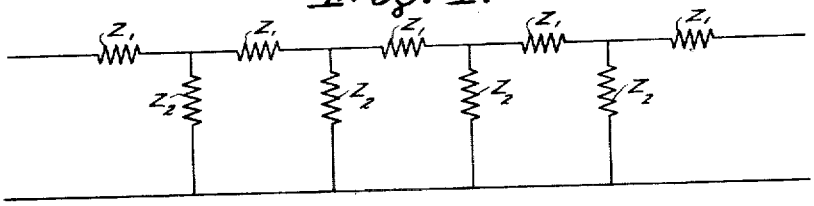
Fig. 1 shows a schematic representation of an acoustic line.

Fig. 1 represents an acoustic line having series impedances $Z_1$ and shunt impedances $Z_2$. It can readily be shown that the propagation constant per section, P, can be expressed in terms of $Z_1$ and $Z_2$. P is in general a complex quantity, having real and imaginary components. We may write $$\text{Cosh } P = \cosh (A + iB) = 1 + \frac{Z_1}{2Z_2} \qquad (1)$$

This may be also written explicitly for the propagation constant as $$P = \log_e \frac{\frac{Z_1}{2} + Z_2 + \sqrt{Z_1 Z_2 \frac{Z_1^2}{4}}}{Z_2} \qquad (2)$$

It follows from the theory of complex quantities that the real part of P, that is, the attenuation constant A, is then given by the natural logarithm of the absolute value of the complex quantity the logarithm of which is the complex quantity P. In the devices of my invention, phase change is of little importance compared to attenuation and we may study attenuation only by simply considering the absolute value of the quantity $$H = \left| \frac{\frac{Z_1}{2} + Z_2 + \sqrt{Z_1 Z_2 + \frac{Z_1^2}{4}}}{Z_2} \right| \qquad (3)$$

where H is the quantity whose logarithm to the base $e$ is P in Equation 2. It will be shown that the devices of my invention yield measured plots of attenuation vs. frequency which are substantially flat over a wide frequency range. This means that the Expression 3, above, must be independent of frequency over the range involved. In my invention, I consider the main acoustic line to comprise an inertance in series with a resistance. The side branches I consider to comprise a resistance, inertance and capacitance, all in series. For the frequencies involved over the flat portion of the characteristic, the capacity reactance is relatively negligible. If now the impedances $Z_1$ and $Z_2$ be considered to have the same phase angle for any one frequency, we may say that $Z_1$ is equal to a real constant $k$ times $Z_2$. This would be true of all frequencies in the range. Making this substitution in Equation 3, we have $$H = \frac{k}{2} + 1 + \sqrt{k + \frac{k^2}{4}} \qquad (4)$$

Since it is impossible to predict precisely what the value of k is for a given device, we may assume a number of values and, by noting the actual attenuation, see readily what the probable value of $k$ is for a given device. Since $k$ is a factor which applies to both the resistance and inertance, it is entirely feasible to predict that to increase the attenuation for a given device $k$ must be made as large as possible without departing from the desired independence of the attenuation per section from variations with frequency. In connection with some of the embodiments of the invention herein shown, it will be apparent that the devices do function in accordance with the simple theory outlined above. Certain graphs will be analyzed in accordance with the theory.

Figure 2:
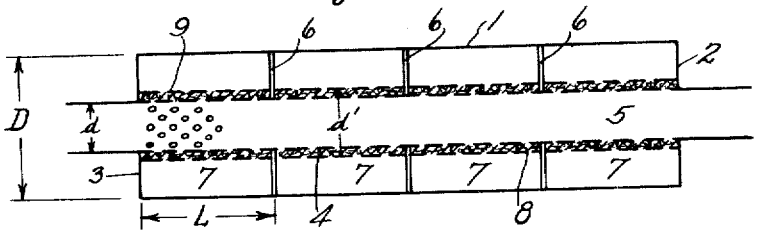
Fig. 2 shows a typical embodiment of the invention.
Figure 3:
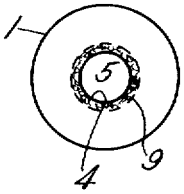
Fig. 3 is a cross sectional view of the device of Fig. 2.

Turning now to specific embodiments of the invention, Fig. 2 shows a cross sectional longitudinal view of a typical silencer. It comprises the generally cylindrical casing 1, of diameter D, fitted with perforate end closures 2, 3 at either end thereof, a centrally disposed tubular member 4 of perforated metal having a diameter $d$ which forms the straight main sound and gas conducting channel 5 extending from one end of the device to the other. The laminated transverse headers 6 extend from the outer casing 1 to the tube 4 to form the side branch compartments 7 each of longitudinal length L. Contiguous to the outside of the perforate tube 4 is a relatively thin, uniform layer of sound absorbing material 8, held in place by the outer perforate tubes 9 of diameter $d'$ which extend from one transverse header or partition to another, as shown. The volume of each cavity 7 is made sufficiently large so that the capacity reactance thereof is small for the frequencies for which the theory applies. The layer of sound absorbing material 8, together with the two perforate members 4, 9 form the acoustic resistance and the acoustic inertance of the side branch, and in the major portion of the frequency range of the device can be considered as forming the major portion of the impedance of the side branch, since as pointed out above the impedance of the cavity beyond the sound absorbing material is very much less than the impedance of the material itself.

The inertance of the sound absorbing material, together with the capacitance of the side branch, shows, for some dispositions, a desirable tendency toward resonance at a frequency lower than the range of frequencies for which the above elementary theory holds. The net result is that the attenuation is held up to a higher value, as the frequency is lowered, than would obtain were the phenomenon of resonance in the side branch entirely absent. The attenuation at the resonant frequency is of the same order of magnitude as that obtained at higher frequencies. The attenuation falls off sharply on the low frequency side of resonance, as might be expected.

The resonance frequency can be computed with sufficient accuracy on the basis of effective inertances determined experimentally, and the known capacitances. The resistance of the layer of sound absorbing material plays a less important direct part at such low frequencies, but is sufficient to produce a very broad resonance "peak" instead of the usual sharp peak, ordinarily associated with resonators having a minimum of absorption. The use of sound absorbing material as described for coupling the main sound conducting channel to the chambers not only produces a generally flat attenuation characteristic throughout the medium and high frequency range, but also serves to lower the frequency response of chambers of given physical dimensions below that which would be obtained by conventional methods of coupling. These two effects combine to produce a wholly novel uniformity of attenuation throughout the frequency range being operated upon, and to permit the use of shorter sections than would otherwise be possible. As is elsewhere pointed out, the use of relatively short sections is desirable in producing the greatest possible uniform attenuation for given length of apparatus. It is a feature of the invention that the same characteristics are obtainable from a single section as are obtained from a device having several sections. Thus the device does not depend upon interactions between adjacent sections for its functioning. Adding sections results in additive attenuation.

Figure 10:
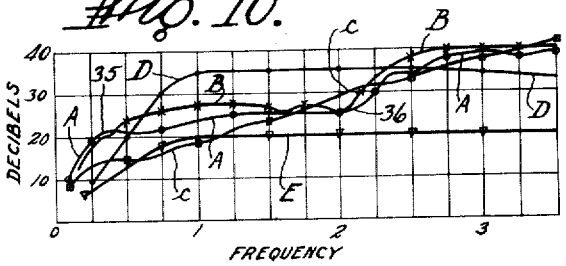
Figs. 10, 11 and 12 show graphs germane to various devices shown.

Curve A, Fig. 10, is the measured plot of a device of four sections constructed in accordance with Fig. 2 for the condition that $L=D=3d$. $d'=1.5d$. In this as in other plots herein shown the frequency is represented by arbitrary abscissae, since the actual frequency is a function of the physical dimensions of the device. The slight hump at point 35 is due to the tendency to resonance in the side branches. The slight dip at point 36 is due to series resonance in the side branch and occurs at a frequency for which L equals a half wave length. The insertion loss in decibels is plotted as ordinates, the device being inserted in a long acoustic line. Curve A is for the condition that the transverse headers 6 are of plain, non-laminated metal. Curve B shows the plot for the device when laminated headers are used. The increased attenuation is due to the fact that the headers 6 transmit less sound by diaphragm action into adjacent sections, thus preventing partial short-circuiting.

Figure 4:
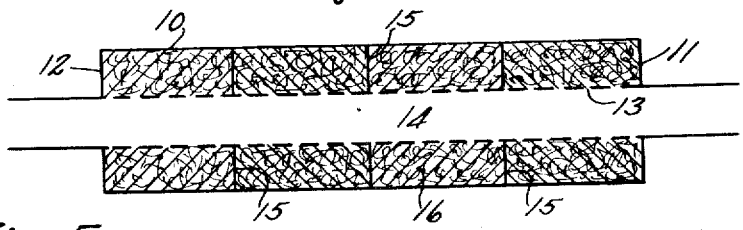
Fig. 4 shows an acoustic device presented for comparison purposes.

Curve C, Fig. 10 was obtained from the device of Fig. 4, which is of the same size and proportions as that of Fig. 2 and comprises a casing 10, perforate end headers 11, 12, a centrally disposed perforate tube 13 which forms the main conducting channel 13; and transverse headers 15 which form the compartments 16. These compartments or side branches are completely filled with sound absorbing material, there being approximately six times the amount used as in the case of the device of Fig. 2. The device of Fig. 4 represents a common form of muffler in use commercially. The improvement in attenuation due to my invention is marked, especially at the lower frequencies, even though but one-sixth of the sound absorbing material is used. It is clear from this comparison that the operation of devices constructed in accordance with my invention is wholly different from that of devices constructed in accordance with Fig. 4 in which it is attempted to secure attenuation solely by the operation of the sound absorbing material itself. This will be even more evident from the form of the invention next to be described.

Curve D, Fig. 10 was taken with a device made in accordance with Fig. 2 for the condition that $D=3d$; $d'=1.5d$, $L=.5D$. Four sections were used. The attenuation is much greater, even though the overall length of the device is half that used to obtain curve A. The resonance frequency in this case does not show itself as a hump in the curve, but is in fact higher due to the fact that, while the volume of the side branch has been cut in half, the conductivity of the layer of sound absorbing material is only about .7 its former value. This is due to the fact that the conductivity of the cylindrical area of the layer is proportional to the diameter of a circle of equal area. Of perhaps more importance is the remarkable flatness of the attenuation frequency curve. Curve E was obtained from a four section device similar in all respects excepting that $L=.25D$. The attenuation is even more uniform; in fact it remaians at 20 decibles over the entire operating portion of the frequency range. The attenuation for the device of curve E is more than half of that for the device of curve D, showing that there is some advantage in the shorter sections. Had the device of curve E been made as long as the device of curve D, therefore including twice the number of sections in the same overall length, the total attenuation would have been substantially greater.

Figure 7:
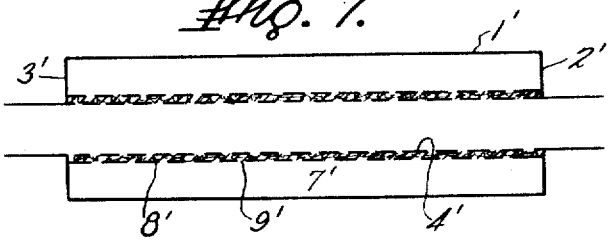
Fig. 7 is a view similar to Figs. 2 and 4 showing a different form of structure.
Figure 11:
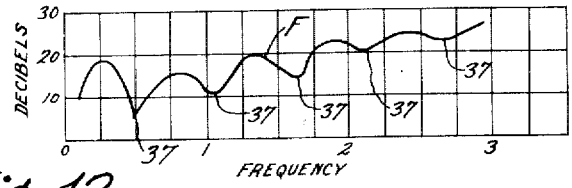

The length of a section must not be made too long with respect to its diameter. A device was made in accordance with Fig. 7 wherein $L=4D$, the other proportions remaining the same. The parts being the same as in Fig. 2, except for the elimination of the partitions 6, they have been indicated by primed numerals. In all devices for which curves are given in this specification, $d$ is the same. Curve F, Fig. 11 is the plot for the device of Fig. 7. The dips 37 are due to series resonance longitudinally in the side branch. The average attenuation is relatively low. Such proportions do not represent an economic use of material, and as will be apparent the device of Fig. 7 lacks the desirable flat-top characteristic of curves D and E. The length of the section in Fig. 7 is a very appreciable part of a wave length and the tendency is greatly increased for sound to enter the side branch at one end, travel longitudinally therethrough, and re-enter the main channel at the other end thereof. For best approximation to the conditions implied by the theory, the direction of the sound wave entering the side-branch should be normal to the surface of the sound absorbing material. Indeed experience with devices of this type shows that maximum possible attenuation, for a given total available length is afforded by the use of very short sections, other things being equal. A compromise must generally be effected, however, since too many transverse headers raise the cost of manufacture. To obtain low frequency response, it is preferable to use short sections of large diameter, rather than long sections of small diameter, for the reasons above given. The lengths of the sections are preferably made less than their diameters. For economic reasons it is generally desirable to form the sound absorbing layer as a continuous body, so that each cavity is coupled to the main sound conducting channel through substantially its entire available coupling area. This is also desirable for acoustical reasons, since as is elsewhere pointed out the attenuation is improved by keeping $Z_2$ low provided this is done without departing from the condition that the ratio between $Z_1$ and $Z_2$ is maintained independent of frequency. This is best accomplished by using a large coupling area. A further advantage in this manner of construction is that the entire length of main channel contained within the device is acted on, there being no spaces intermediate the coupling zones as in the usual type of silencing device.

Figure 5:
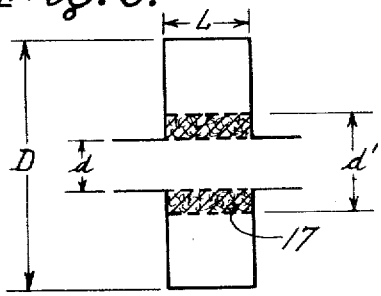
Fig. 5 shows an embodiment of the invention employing a single section.
Figure 6:
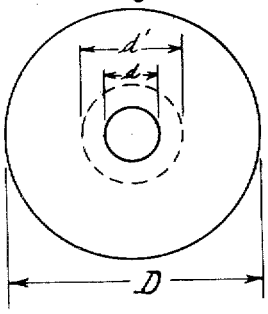
Fig. 6 is a side view of the device shown in Fig. 5.
Figure 12:
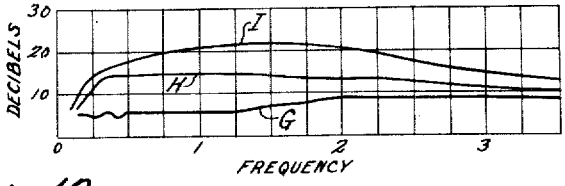

Fig. 12 shows three graphs taken with a device constructed in accordance with Fig. 5, wherein $D=5d$, $L=.3D$ and $d'=2.5d$. Curve G is for a unit amount of sound absorbing material 17 uniformly distributed. This curve is seen to be relatively flat and of average attenuation comparable to one section of the device of Fig. 2 which yielded curve A, Fig. 10. Curves H and I are for the same device, but with one-half and one-quarter unit amount of sound absorbing material, respectively, the same being uniformly distributed in each case. Our elementary theory shows that in order to increase the attenuation, $k$ must be larger. One way in which to increase $k$ is to decrease $Z_2$. In the case of these curves G, H, I, it is apparent that the attenuation does increase with a decrease of $Z_2$, since, by decreasing the amount of sound absorbing material, the resistance is decreased and the inertance likewise decreased. Since the curves are each of the same type, it is evident that both the resistance and inertance have been changed without greatly changing the phase angle between them. Curve I is beginning to depart from the conditions imposed by the elementary theory. Decreasing $Z_2$ to a limit would result in the ordinary resonance curve.

Disposing the sound absorbing material as shown in the several devices described in this specification produces the results described. The same amount of sound absorbing material disposed contiguous with the outer shell yields a wholly different plot, having high attenuation for a relatively narrow range of frequencies and relatively low attenuation over the remainder of the frequency spectrum, especially at low frequencies. The reason for the improvement in the shape of the plot may be further said to be that in my invention, the sound absorbing material is disposed at a point of high acoustic velocity whereas having the material disposed contiguous with the outer shell instead of at the entrance to the sidebranch, places the material at a point of low acoustic velocity.

Figure 8:
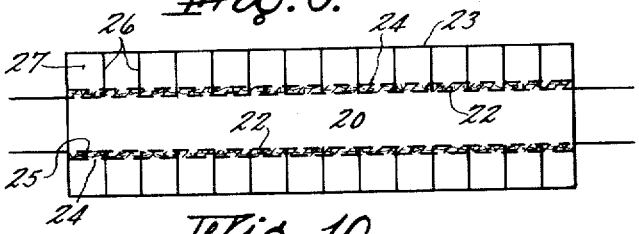
Fig. 8 shows a ventilating duct employing the principles of the invention.
Figure 9:
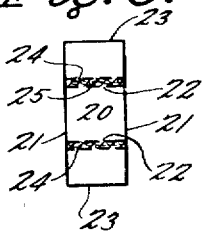
Fig. 9 is a cross sectional view of the duct shown in Fig. 8.

In Figs. 8 and 9 is shown a ventilating duct treated in accordance with my invention, and illustrating the adaptability of the invention to conduits of other than circular shape. In this case the duct forming the main sound conducting channel 20 is formed by side members 21 and perforated members 22. The side members 21 extend beyond these perforated members and are joined by members 23 so as to form opposed closed spaces on either side of the main channel. Perforated members 24 are located parallel to the members 22, the space between them being filled with sound absorbing material 25. Partitions 26 extend between the members 23 and 25 to divide the longitudinally extending chambers into short chambers 27. The partitions serve as described above to prevent any substantial longitudinal travel of sound waves through the chambers, preventing by-passing of the sound waves in the manner referred to in connection with Fig. 7. Depending upon the amount of attenuation required, and forming a practical balance between economy of construction and theoretical improvement in performance, the partitions are preferably spaced fairly close together.

It is now apparent that plots of various types are obtainable with differently designed or proportioned sidebranches. The matter may profitably be summarized briefly. Curve F (Fig. 11) shows that for relatively long sidebranches by-passing of sound waves due to series resonance in the sidebranches occurs at comparatively low frequencies. Where the lengths of the sidebranches are shorter as in curve B (Fig. 10) the effect of such resonance is shifted to still higher frequencies, and where the length is still shorter, as in curves D and E (Fig. 10) the effect of series resonance in the sidebranches may be shifted to so high a frequency as to be of little importance for the ordinary sound spectrum. The shorter the section, other things being equal, the flatter the plot over the usual frequency range. It is preferred to keep the lengths of the sections shorter than one-half wave length for the highest important frequency which the device is to be called upon to attenuate. The use of excessively short sections is, however, undesirable on account of the added expense and on account of the raising of the point at which low frequency resonance occurs. It is possible by combining sections of different characteristics to utilize both the flat-top property of short sections and the low frequency response of longer sections, or to simulate these properties by other means.

Figure 13:
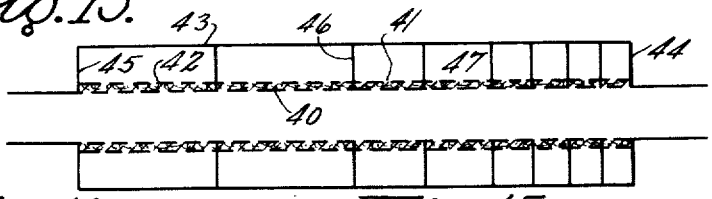
Figs. 13, 14 and 15 show composite structures embodying the principles of the invention.

Fig. 13 shows a composite structure having a number of sections of different lengths, other factors being equal for each section. This structure utilizes perforated tubes 40 and 41, between which is a layer of sound absorbing material 42. An outer cylinder 43 is provided as in the case of Fig. 2, fitted with end headers 44 and 45. Between the cylinder 43 and the inner perforated tubes extend partitions 46, in this instance so spaced as to provide a plurality of chambers 47 of differing sizes.

Figure 14:
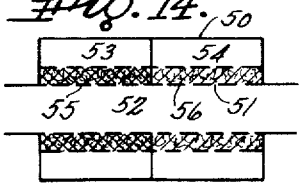

Another method of obtaining a composite structure is shown in Fig. 14. Two sections only are shown, the device comprising the casing 50, the perforate tube 51 forming the main channel 52, the two sidebranches 53, 54, having the layers of sound absorbing material 55, 56, respectively. The material 55 is packed more densely than the material 56, thus yielding a greater resistance and inertance and giving to the two said sidebranches different frequency response characteristics.

Figure 15:
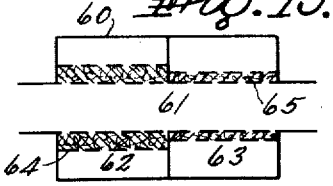

The composite structure of Fig. 15 comprises the casing 60, the main channel 61, the sidebranches 62, 63 and the layers of sound absorbing material 64, 65 respectively. In this case, the layer 64 is made thicker than the layer 65. This construction is useful where the sound absorbing material is available in one density only and is not susceptible of different degrees of packing into its confining space. It is obvious that a composite structure could also be formed by sections of different diameter. This type of construction is not always feasible due to the constructional difficulties, as well as the resulting appearance of the device. It is further to be stated that the sound absorbing layers shown in the various embodiments of the invention may be replaced with suitable constructions not involving the use of fine, porous material. The essential thing is to have an acoustic resistance and inertance at the entrance to the side branch.

What I claim is:

1. A sound attenuating device comprising a main sound conducting channel having pervious walls of sound absorbing material and wall members forming a closed cavity on that side of the pervious walls opposite the main channel, said sound absorbing material and said cavity being acoustically in series.

2. A sound attenuating device comprising a main sound conducting channel and one or more closed cavities each laterally separated from the main sound conducting channel by and acoustically coupled to said channel through one or more pervious bodies of sound absorbing material exposed both to the channel and to each cavity and forming an acoustic coupling between the channel and the cavity distributed along a substantial portion of the longitudinal extent of the cavity.

3. A sound attenuating device comprising a main sound conducting channel and one or more closed cavities each laterally separated from the main sound conducting channel by and acoustically coupled thereto through one or more bodies of pervious sound absorbing material exposed both to the channel and to each cavity and forming an acoustic coupling between the channel and the cavity distributed along a substantial portion of the longitudinal extent of the cavity, the depth of the cavity beyond the sound absorbing material being sufficient to make the acoustic impedance of the cavity substantially less than the acoustic impedance of the sound absorbing material at the frequency or frequencies to be attenuated.

4. A sound attenuating device comprising a main sound conducting channel and one or more closed cavities each coupled to the main sound conducting channel through a body of sound absorbing material, the distance the sound absorbing material extends along the main sound conducting channel in each coupling zone being substantially shorter than one-half wave length for the highest frequency which the device is designed to attenuate.

5. A sound attenuating device comprising a main sound conducting channel and one or more closed cavities each coupled to the main sound conducting channel through a body of sound absorbing material, the acoustic impedance of the cavity beyond the sound absorbing material being substantially less than the acoustic impedance of the sound absorbing material, and the distance the sound absorbing material extends along the main sound conducting channel in each coupling zone being substantially shorter than one-half wave length for the highest frequency which the device is designed to attenuate.

6. A sound attenuating device comprising a cylindrical tube forming a main sound conducting channel, an annular chamber surrounding the tube, and a body of sound absorbing material extending along the main sound conducting channel and interposed between said channel and the chamber to furnish the sole acoustic coupling between them, the tube being perforated to permit the passage of sound waves from the main sound conducting channel into the chamber through the sound absorbing material.

7. A sound attenuating device comprising a main sound conducting channel, a chamber surrounding the channel and divided by transverse partitions into a plurality of acoustically separate compartments spaced longitudinally along the channel, and a body of sound absorbing material forming part of the bounding wall of the channel and furnishing the sole acoustic coupling between the channel and each compartment.

8. A sound attenuating device comprising a cylindrical tube forming a main sound conducting channel, an annular chamber surrounding the tube and divided by transverse partitions into a plurality of acoustically separate compartments spaced longitudinally along the tube and each having a length parallel to the axis of the tube substantially less than the diameter of the chamber, a body of sound absorbing material interposed between the tube and each compartment contiguous to the tube and furnishing the sole acoustic coupling between them, the tube being perforated to permit passage of sound waves from the main sound conducting channel into the compartments through the sound absorbing material.

9. A sound attenuating device comprising a main sound conducting channel, a chamber surrounding the channel and divided by transverse partitions into a plurality of acoustically separate compartments spaced longitudinally along the channel, and a body of sound absorbing material interposed between the channel and each compartment and furnishing the sole acoustic coupling between them, the length of the coupling zones of the sound absorbing material in a direction along the main sound conducting channel being insufficient to permit any substantial bypassing of sound waves through the chambers along the main sound conducting channel.

10. A sound attenuating device comprising a main sound conducting channel and one or more closed cavities each coupled to the main sound conducting channel through a body of sound absorbing material, the length of each body of sound absorbing material being substantially the same as the length of the cavity with which it is associated, and the length of each cavity being sufficiently short in proportion to its diameter so that the attenuation will be substantially uniform throughout the sound spectrum to be attenuated.

11. A sound attenuating device comprising a sound conducting channel, a chamber surrounding the channel, a body of sound absorbing material interposed between the channel and the chamber and furnishing the sole acoustic coupling between them, and means within the chamber for dividing it into a plurality of cavities each independently coupled to the main sound conducting channel through a body of sound absorbing material, the length of each cavity being sufficiently short in proportion to its diameter so that the attenuation will be substantially uniform throughout the sound spectrum to be attenuated.

12. A sound attenuating device comprising a main sound conducting channel and one or more closed cavities each coupled to the main sound conducting channel through a body of sound absorbing material, the length of each body of sound absorbing material being substantially the same as the length of the cavity with which it is associated, the lengths of at least some of the cavities being made different from the lengths of other cavities so that a composite structure is obtained having substantially uniform attenuation throughout the sound spectrum to be attenuated.

13. A sound attenuating device comprising a main sound conducting channel and one or more closed cavities each laterally separated from the main sound conducting channel by and acoustically coupled thereto through a body of sound absorbing material, the length of each body of sound absorbing material in the direction or travel of sound waves along the channel being substantially the same as the length of the cavity with which it is associated.

14. A sound attenuating device comprising a main sound conducting channel and one or more closed cavities each coupled to the main sound conducting channel through a body of sound absorbing material, the amount of sound absorbing material per unit area in some of the bodies being different from the amount thereof in other of the bodies.

15. A sound attenuating device comprising a main sound conducting channel and one or more closed cavities each coupled to the main sound conducting channel through a body of sound absorbing material, the density of the sound absorbing material in some of the bodies being different from the density thereof in other of the bodies.

16. A sound attenuating device comprising a main sound conducting channel and one or more closed cavities each coupled to the main sound conducting channel through a body of sound absorbing material, the thickness of the mass of the sound absorbing material in some of said bodies being different from the thickness thereof in other of the bodies.

17. A sound attenuating device comprising a main sound conducting channel, a pervious layer of sound absorbing material, and a casing forming a closed chamber, the sound absorbing material forming a substantial part of the bounding wall between the channel and the chamber, the volume of the space occupied by sound absorbing material being on the order of one-sixth of the volume between the channel and the walls of the casing.

18. A sound attenuating device comprising a main sound conducting channel, a surrounding pervious layer of sound absorbing material having an extent transversely of the channel on the order of one and a half times the corresponding extent of the channel, and a casing forming a closed chamber surrounding the sound absorbing material and having an extent transversely of the channel on the order of three times the corresponding extent of the channel.

19. A sound attenuating device comprising a main sound conducting channel, a pervious layer of sound absorbing material, and a casing forming a closed chamber, the sound absorbing material forming a substantial part of the bounding wall between the channel and the chamber, the volume of the space occupied by sound absorbing material being on the order of one-sixth of the volume between the channel and the walls of the casing, the extent of the chamber along the channel being less than one-half wave length for any frequency which is to be attenuated.

20. A sound attenuating device comprising a main sound conducting channel, a surrounding pervious layer of sound absorbing material having an extent transversely of the channel on the order of one and a half times the corresponding extent of the channel, and a casing forming a closed chamber surrounding the sound absorbing material and having an extent transversely of the channel on the order of three times the corresponding extent of the channel, the extent of the chamber along the channel being less than one-half wave length for any frequency which is to be attenuated.

ROLAND B. BOURNE.

CERTIFICATE OF CORRECTION.

Reissue No. 22,283. March 9, 1943.

ROLAND B. BOURNE.

It is hereby certified that error appears in the printed specification of the above numbered patent requiring correction as follows: Page 3, first column, line 60, for "channel 13" read --channel 14--; and second column, line 23, for "remaians" read --remains--; page 6, first column, line 3, for "direction or" read --direction of--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.